United States Patent [19]
Seiler et al.

[11] Patent Number: 5,296,031
[45] Date of Patent: Mar. 22, 1994

[54] ELECTROSTATIC POWDER SPRAY COATING SYSTEM FOR CAR BODIES

[75] Inventors: Daniel Seiler, Jona; Heinz Hofler, St. Gallen, both of Switzerland

[73] Assignee: Gema Volstatic AG, St. Gallen, Switzerland

[21] Appl. No.: 929,358

[22] Filed: Aug. 14, 1992

[30] Foreign Application Priority Data

Aug. 14, 1991 [DE] Fed. Rep. of Germany ....... 4126891

[51] Int. Cl.$^5$ .............................................. B05B 5/025
[52] U.S. Cl. ......................................... 118/631; 55/353; 55/354; 55/DIG. 46; 118/634; 118/312; 118/DIG. 7
[58] Field of Search ................. 55/471, 338, 351, 353, 55/354, DIG. 46; 118/603, 610, 634, 308, 309, 310, 312, 313, 315, 323, 326, DG. 7, 631, 629, 630; 427/470, 479, 480, 424

[56] References Cited

U.S. PATENT DOCUMENTS

| | | |
|---|---|---|
| 3,847,118 | 11/1974 | Ambry ................................ 118/603 |
| 3,871,328 | 3/1975 | English ............................... 118/629 |
| 3,902,455 | 9/1975 | Lehmann et al. ............ 118/DIG. 7 |
| 4,153,008 | 3/1979 | Marino et al. ....................... 118/634 |
| 4,257,345 | 3/1981 | Brice ................................... 118/634 |
| 4,292,056 | 9/1981 | Blodmer ............................. 118/326 |
| 4,568,368 | 2/1986 | Brice ................................... 118/634 |
| 4,883,506 | 11/1989 | Ribnitz ............................... 55/351 |
| 4,977,000 | 12/1990 | Murayama et al. .......... 118/DIG. 7 |
| 5,056,459 | 10/1991 | Urban et al. .................. 55/DIG. 46 |
| 5,171,368 | 12/1992 | Mazakas ............................. 55/354 |

Primary Examiner—Joseph W. Drodge
Attorney, Agent, or Firm—Schwartz & Weinrieb

[57] ABSTRACT

An electrostatic powder spray coating system for car bodies is disclosed. Above the car bodies (14) are moved through the cabin and from which the spray organs (94) are supplied with powder. The powder container (92) is supplied with fresh powder and recycled powder from a supply container (36). Short paths between the powder container and spray organs allow precise metering and therefore a good coating quality. The spray coating is applied within an arrangement of inner and outer cabins which allows pressurizing of space between the cabins to prevent ingress of atmospheric air into and egress of powder out of the system.

20 Claims, 2 Drawing Sheets

ELECTROSTATIC POWDER SPRAY COATING SYSTEM FOR CAR BODIES

FIELD OF THE INVENTION the present invention relates generally to electrostatic powder spray coating systems, and more particularly to an electrostatic powder spray coating system for car bodies.

BACKGROUND OF THE INVENTION

Electrostatic coating systems for coating car bodies with liquid paint are known, for example, from DE-OS 39 11 454. The coating system described there is a so-called "roof machine" for coating car bodies from above. With this system, the surfaces of car bodies which face upwards are coated, in particular, but the surfaces of the car body which face towards the front and the rear can also be coated with it. Until now, car bodies have usually not been coated with powder, but rather with liquid paint, because smoother surfaces can be achieved with the latter. Liquid coating materials, however, contain solvent and other volatile components, which evaporate on the car body during the spraying process and firing of the liquid paint on the car body, and therefore represent an environmental problem. The part of the liquid coating material which is sprayed past the car bodies is waste. For atomization of liquid coating material, different spray organs are also necessary than for atomization of coating material in powder form, which latter material is passed to the spray organs in an air stream. However, powder has the advantage, as compared with liquid coating materials, that it does not contain any volatile components, so that powder does not result in any environmental problems in this regard. Another difference is that powder which is sprayed past the object to be coated, or bounces off it, can be recovered and reused. Various techniques are known for recycling powder, for example, slanted cabin floors, from which the powder slides out of the cabin into a feed groove arranged next to it, or into a container, conveyor grooves, ductor devices and motor-driven, continuously moving endless filter belts (DE-PS 24 30 517) on the cabin floor. Both for liquid coating material and for powder coating material, the cabin and all flow paths of the coating material must be cleaned very carefully when changing from one kind of material to another kind of material, before the latter can be used. Otherwise, material mixing occurs, resulting in coating defects and color defects. Such a so-called "color change" must take place very rapidly, however, so that little production time is lost for achieving the coating operation. Furthermore, no coating material accumulations, either of liquid material or powder material, are allowed to form within the coating system; these would lead to coating problems on the object to be coated. Furthermore, such material accumulations are also not allowed so as not to cause any explosive material concentrations in the cabins. To prevent powder coating material from accumulating on the cabin walls, interchangeable cabin walls, air-flooded cabin walls, high electrical potential in the cabin walls and cabins with plastic walls (DE-OS 39 19 614) have already become known.

Electrostatic charging of powder is known from DE-PS 20 65 699.

OBJECT OF THE INVENTION

With the invention, the task to be accomplished is to use powder for coating of car bodies, in such a way that an acceptable, good coating quality is achieved, that the coating method and the coating system are simple in design and can be used in many different ways, that color changes can take place rapidly, and that no explosive coating material concentrations and no problematic environmental impact occur.

SUMMARY OF THE INVENTION

This task is accomplished, according to the invention, with the characterizing features of the present invention more fully set forth within the following specification and within the appended claims.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 2 is a vertical cross-section along the plane 2—2 of FIG. 1.

DETAILED DESCRIPTION OF THE PREFERRED EMBODIMENT

Figure 2:
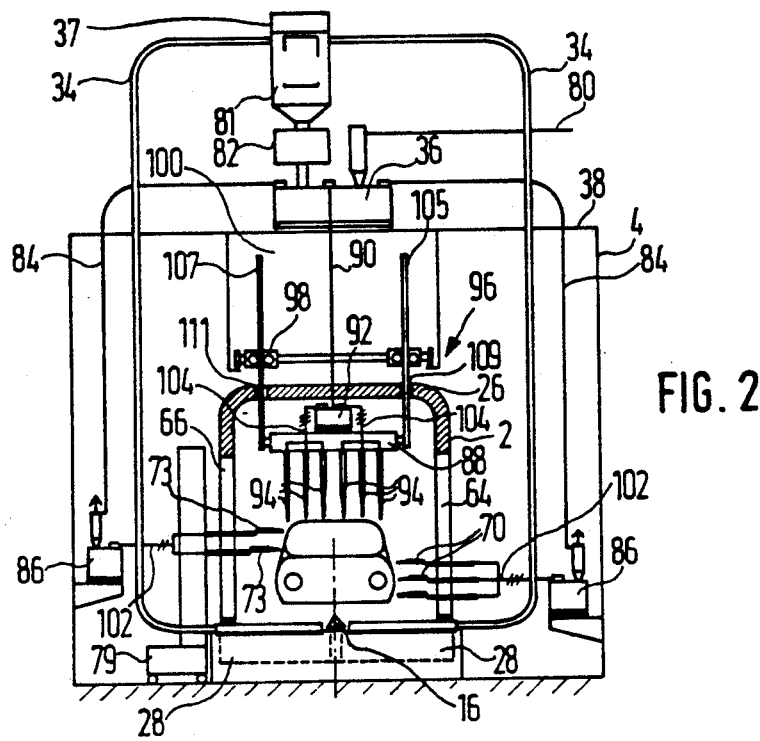
FIG. 2 is a schematic horizontal cross-section through an electrostatic powder spray coating system according to the invention, for car bodies.
Figure 1:
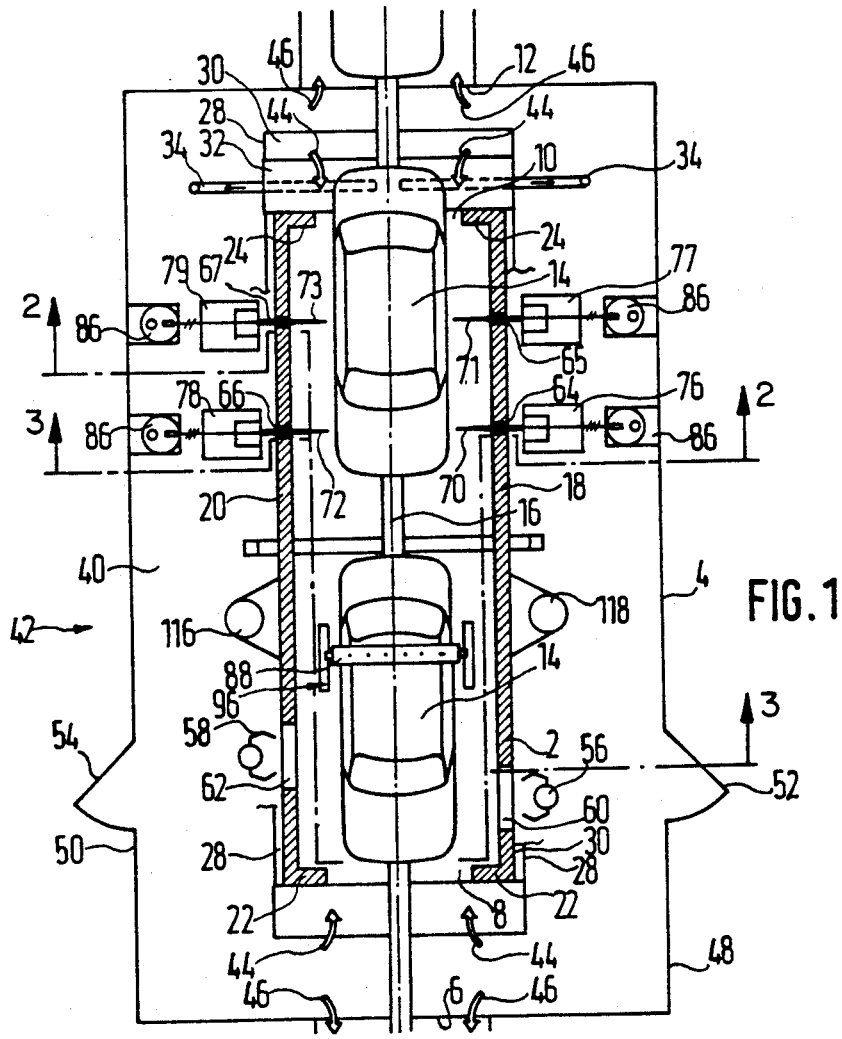

The electrostatic spray coating system for spray coating car bodies with powder is particularly well suited for the application of transparent cover coats of powder coating material onto paint layers which were applied as liquid paint or liquid varnish onto car bodies. Furthermore, it is particularly well suited for the application of primer layers of powder material onto car bodies, which are subsequently coated with liquid paint. The spray coating system according to the invention, as shown, is a so-called "roof machine," because it is arranged at a level located higher than the car bodies, and the car bodies are moved through the spray underneath the roof machine. Therefore it is particularly well suited for coating the surfaces of the car bodies which face upward, but the outer side surfaces of the car bodies, particularly the body surfaces which face towards the front and the rear, can also be coated with the spray coating system of the present invention.

The electrostatic spray coating system according to the invention, as shown in FIG. 1 to 4, essentially consists of an inner cabin 2 and an outer cabin 4 which surrounds the former at a lateral, front and rear as well as overhead distance, with end openings 6, 8, 10 and 12 for conveying car bodies 14 to be coated through the system in the longitudinal direction, by means of a motor-driven conveyor device 16, which is moved through the cabins 2 and 4 in the longitudinal direction, in a belt-shaped narrow region in the center of the cabins.

At least the inside surfaces, and preferably, the entire structure of the lateral long walls 18 and 20, the end walls 22 and 24, as well as the ceiling 26 of the inner cabin 2 consist of plastic, which does not exert any electrostatic attraction force on the coating powder. Preferably, this is a plastic which electrostatically rejects the coating powder. This prevents explosively high powder concentrations in the cabin and powder accumulations on the inner surfaces of the inner cabin 2. Furthermore, in this way, the time required to clean the cabin 2 when changing colors is significantly reduced. Preferably, all the walls 18, 20, 22 and 24 as well as the ceiling 26 of the inner cabin 2 consist of several plastic layers in sandwich construction, over their entire thickness. Known plastic designs are known, for example, from DE-OS 39 19 614.

The cabin floor of the inner cabin 2 is formed by at least one endless filter belt 28, driven by a motor 27 and moving continuously, which is permeable for air but not for powder. Preferably, a slight partial vacuum is generated under the segment 30 of the filter belt 28 which forms the cabin floor, through means of which the powder particles suspended in the inner cabin 2 are moved downward onto the filter belt 28, in addition to the effect of gravity. The upper segment 30 of the filter belt 28, which forms the cabin floor, moves in the longitudinal cabin direction, preferably in the same direction as the car bodies to be coated. At one end of the inner cabin 2, preferably between the latter and the outer cabin 4, there is a suction device 32 which extends over the entire width of the filter belt 28, which draws off the powder lying on the upper segment 30 of the filter belt 28, and passes it, by means of lines 34, to a supply container 36, which is arranged on the roof 38 of the outer cabin 4, approximately in the center of the width direction. The roof 38 of the outer cabin 4 is separated a predetermined vertical distance from the roof 26 of the inner cabin 2. According to the invention, the floor of the inner cabin 2 preferably consists of two filter belts 28 arranged parallel next to one another, which extend in the longitudinal cabin direction, which are both driven by the motor 27, and between which the transport device 16 is arranged, as represented in the drawings.

Preferably, the air pressure in the inner cabin 2 is kept at a lower value than the air pressure in the intermediate space 40 between the inner cabin 2 and the outer cabin 4, by means of fans 37 and 39, and the latter air pressure in the intermediate space 40 is preferably kept at a higher value than the air pressure of the outside environment 42, so that an air flow 44 into the inner cabin 2 and an air flow 46 out of the outer cabin 4 into the outside environment 42 is obtained. These air flows 44 and 46 are very slight. For this purpose, it is necessary that the openings in the inner cabin 2 and in the outer cabin 4 are as small as possible. In each of the side walls 48 and 50 of the outer cabin 4, which extend lengthwise, there is a door 52 or 54, respectively, which permits persons 56 and 58 to have access to the intermediate space 40, for example in order to coat parts of the car body by hand, through side wall openings 60 and 62 of the inner cabin 2, or to perform other work.

Spray organs 70, 71, 72 and 73 for coating the car bodies 14 from the side project into the inner cabin 2 through vertical slits 64, 65, 66 and 67 of the side walls 18 and 20 of the inner cabin 2. The spray organs 70, 71, 72 and 73 are an integral part of automatic spray devices 76, 77, 78 and 79, two of which are arranged in the intermediate space 40 between the side walls 18 and 48, and two of which are arranged between the side walls 20 and 50 of the two cabins 2 and 4. The spray devices 76, 77, 78 and 79 can be moved lateral to the car bodies 14, along with their spray organs 70, 71, 72 and 73, and the spray organs 70, 71, 72 and 73 can be moved vertically in the slits 64, 65, 66 and 67. Each spray device 76, 77, 78 and 79 can have one or more spray organs 70, 71, 72 or 73. For example, in the embodiment shown in the drawing, the spray device 76 has three spray organs 70, the spray device 78 has five spray organs 72, the spray device 79 has two spray organs 73, and the spray device 77 has one spray organ 71.

Fresh powder is passed to the supply container 36 by means of a line 80, and recycled powder is passed to it from the inner cabin 2 by means of the lines 34 of the suction device 32, a filter 81 and a screen 82. The mixture of fresh powder and recycled powder is passed to the supply container 36, by means of lines 84, to powder containers 86, which are arranged in the intermediate space 40 between the side walls 18 and 48, as well as 20 and 50 of the two cabins 2 and 4, in each case close and at approximately the same height as the spray devices 76, 77, 78 and 79, and the spray organs 70, 71, 72 and 73 of which are supplied with powder from these powder containers 86. In addition, the mixture of fresh powder and recycled powder is passed, by means of a line 90, from the supply container 36 to a powder container 92, from which spray organs 94 of a so-called "roof machine" are supplied with powder, with which the surfaces of the car bodies 14 moving through the cabin and beneath the roof machine, which face upwards, to the front and the rear, are coated with powder. Furthermore, the spray organs 94 of the roof machine can also be arranged so that they can also coat the side surfaces, if the roof machine is lowered down next to the car bodies 14. The roof machine 96 has a carrier 88 arranged below the ceiling 26 of the inner cabin 2, which carries the spray organs 94 of the roof machine and also the powder container 92 of this roof machine which is arranged below the ceiling. The powder container 92 of the roof machine 96 and the supply container 36 arranged on the roof 38 of the outer cabin 4 are arranged essentially vertically one above the other, in such a way that short lines 84 and 90 between the supply container 3 and the powder containers 86 and 92 are obtained. The carrier 88 is preferably suspended on a carriage 98, which is arranged in the vertical intermediate space 100 between the two roofs 26 and 38 of the two cabins 2 and 4, and can be moved in the longitudinal cabin direction, together with or opposite to the direction of movement of the car bodies 14. Preferably, the carrier 88 can pivot the spray organs 94 which it carries, and thereby direct them against the car bodies in specific spray directions. It is furthermore important for the coating quality that the powder containers 86 and 92 are arranged in such a way that the powder lines 102 from the powder containers 86 to the laterally arranged spray organs 70 to 73 which are supplied with powder from the powder containers, and the powder lines 104 from the upper powder container 92 of the roof machine 96, to the spray organs 94 which are also supplied with powder from the powder container, are very short, so that a good coating quality and little powder loss is achieved. According to FIG. 2 and 3, the carrier 88 is connected with the carriage 98 by means of lift rods 105 and 107, which can move vertically, and project through longitudinal slits 109 and 111 in the roof 26 of the inner cabin 2. The spray organs 94 of the roof machine 96 can preferably be moved up and down vertically, moved laterally to the longitudinal cabin direction, and pivoted around a horizontal axis, as is indicated in FIG. 3 with arrows 95, 97 and 99.

Figure 3:
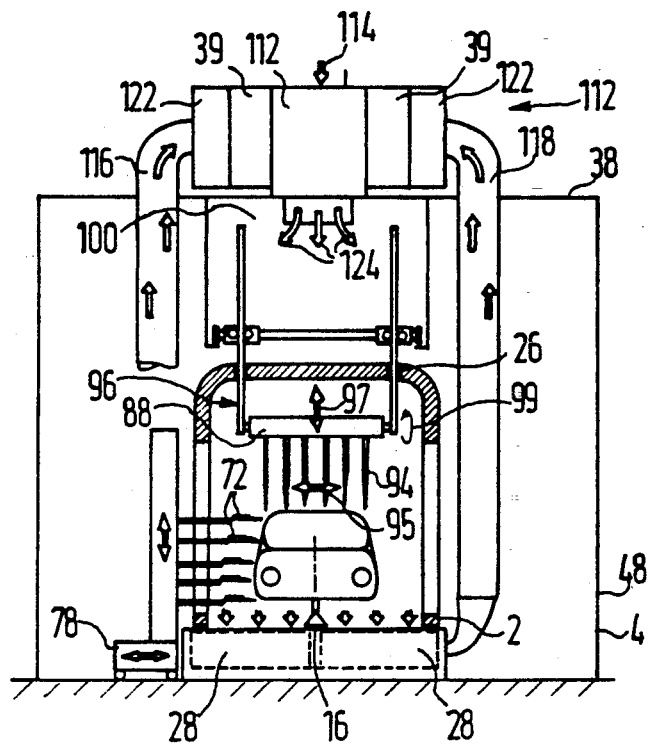
FIG. 3 is a schematic cross-section along the plane 3—3 of FIG. 1.

The cross-section along line 3—3 as shown in FIG. 3 shows a cabin air conditioning system 112 for interior air conditioning of the two cabins 2 and 4. The air conditioning system 112 draws fresh air 114 in at the top, and it draws air from the interior of the inner cabin 2, by means of the fans 39, through the upper segment 30 of the two endless, continuously moving filter belts 28 which are arranged parallel and next to one another and form the cabin floor, by means of the intermediate space between the upper segment 30 and the lower segment 120, and by means of lines 116 and 118, filters the air drawn out from the inner cabin 2 through the lines 116 and 118 in filters 122, mixes this air drawn out of the cabin 2 by means of the lines 116 and 118 with fresh air 114, and passes this air mixture 124 into the upper intermediate space 100 between the ceiling 26 of the inner cabin 2 and the roof 38 of the outer cabin 4. From there, the air mixture 124 flows along the roof machine 96, into the inner cabin 2, as well as into the lateral intermediate space 40 between the two cabins 2 and 4, and from the latter, in accordance with the arrows 44, also into the inner cabin, as well as in accordance with the arrows 46, from the outer cabin 4 out into the outside environment 42. In this connection, a pressure which is lower than the pressure in the intermediate spaces 40 and 100 between the two cabins 2 and 4 is maintained in the inner cabin 2, and the pressure between these two cabins 2 and 4 is greater than the pressure of the outside environment 42.

Figure 4:
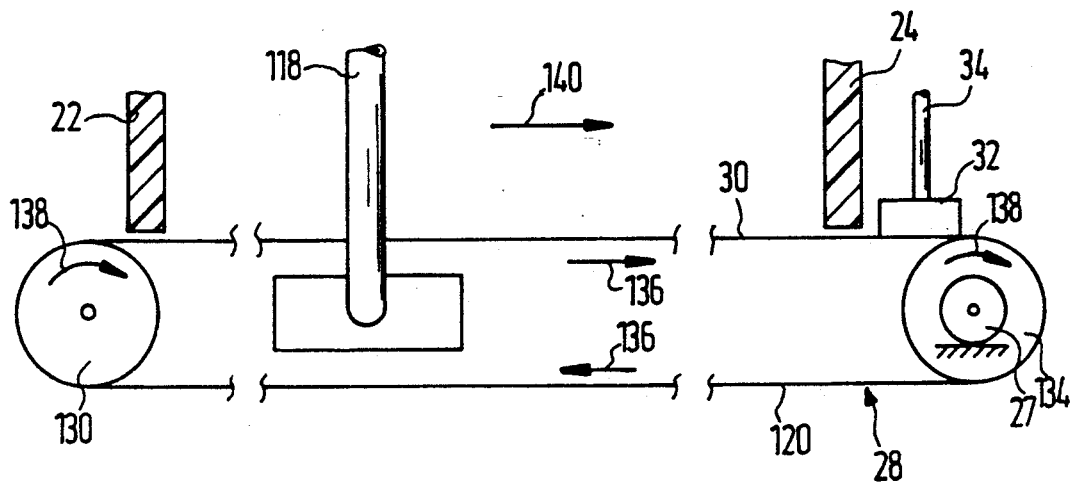
FIG. 4 is a schematic side view from the right side of FIG. 3.

FIG. 4 shows a side view, seen from the right side of FIG. 3, of one of the two endless filter belts 28 which are arranged parallel and next to one another, with the upper segment or part 30 and the lower segment or part 120. The filter belt 28 runs over a non-driven roller 130 at one end of the cabin, and over a roller 134 driven by the motor 27 at the other end of the cabin. Preferably, the motor 27 simultaneously drives a corresponding roller 134 for the filter belt 28 which is arranged parallel, and is not evident in FIG. 4, if the cabin floor is formed not just by one such filter belt 28, but rather by two endless filter belts 28 which are arranged parallel to one another. Arrows 136 indicate the direction of movement of the filter belt 28, arrows 38 indicate the direction of rotation of the rollers 130, 134, and an arrow 140 indicates the direction of movement of the car bodies 14.

Obviously, many modifications and variations of the present invention are possible in light of the above teachings. It is therefore to be understood that within the scope of the appended claims, the present invention may be practices otherwise than as specifically described herein.

We claim:

1. An electrostatic powder spray coating system for electrostatically spray coating articles, comprising:

a spray coating cabin;

means for transporting articles-to-be-spray-coated through said cabin in a longitudinal direction of said cabin;

an outer cabin spaced from said spray coating cabin along longitudinal sides of said spray coating cabin and along a roof portion of said spray coating cabin;

electrostatic powder spray coating means, disposed within spaces defined between said outer cabin and said spray coating cabin and extending through said longitudinal sides and said roof portion of said spray coating cabin, for electrostatically charging said powder to an electrical potential which is different than the electrical potential of said articles-to-be-spray-coated and for electrostatically spray-coating said articles-to-be-spray-coated with said electrostatically charged powder;

a source of said powder fluidically connected to said electrostatic powder spray coating means for supplying said powder to said electrostatic powder spray coating means; and means for recovering excess powder from said spray coating cabin and for conveying said recovered excess powder to said source of said powder for reuse within said electrostatic powder spray coating means.

2. A system as set forth in claim 1, wherein:
said articles-to-be-spray-coated comprise car bodies.

3. A system as set forth in claim 2, wherein:
said spray coating means extending through said roof portion of said spray coating cabin comprises a plurality of spray organs disposed within said spray coating cabin so as to be disposed immediately above said articles being transported through said spray coating cabin; and said source of said powder comprises a supply container for said powder which is disposed within said spray coating cabin and beneath said roof portion of said spray coating cabin so as to be interposed between said roof portion of said spray coating cabin and said plurality of spray organs whereby supply lines for said powder, defined between said supply container and said spray organs, are minimized.

4. A system as set forth in claim 3, wherein:
said source of said powder further comprises a main supply container for said powder which is disposed externally of said spray coating cabin so as to receive a fresh supply of said powder as well as said recovered excess powder from said means for recovering said excess powder; and said main supply container is fluidically connected to said supply container for said roof spray organs so as to supply said supply container for said roof spray organs with a mixture of said fresh and recovered powder.

5. A system as set forth in claim 4, wherein:
said spray coating means extending through said longitudinal sides of said spray coating cabin comprises a plurality of spray organs disposed within said spray coating cabin so as to be disposed immediately adjacent side portions of said articles being transported through said spray coating cabin; and said source of said powder comprises a plurality of supply containers disposed within said spaces defined between said spray coating cabin and said outer cabin and fluidically interposed between and interconnected to said main supply container and said plurality of spray organs disposed adjacent to said side portions of said articles for conducting said powder from said main supply container to said plurality of spray organs disposed adjacent to said side portions of said articles.

6. A system as set forth in claim 1, wherein:
interior wall surfaces of said spray coating cabin are fabricated from a plastic material which has electrostatic properties such that said powder is prevented from accumulating upon said interior wall surfaces of said spray coating cabin.

7. A system as set forth in claim 1, wherein:
said means for recovering said excess powder from said spray coating cabin comprises at least one endless filter belt disposed within a bottom portion of said spray coating cabin.

8. A system as set forth in claim 7, further comprising:
vacuum means interposed between an upper run of said endless filter belt and a lower run of said endless filter belt, said filter belt being substantially permeable with respect to air but impermeable with respect to said powder, whereby said vacuum means causes said excess powder to be attracted to and accumulate upon said upper run of said endless filter belt; and
second vacuum means operatively associated with said upper run of said endless filter belt for withdrawing said accumulated excess powder from said upper run of said endless filter and conveying said withdrawn excess powder to said source of said powder.

9. A system as set forth in claim 7, wherein:
said at least one endless filter belt comprises a pair of endless filter belts disposed adjacent to each other but with said means for transporting said articles interposed between said pair of endless filter belts.

10. A system as set forth in claim 7, wherein:
said at least one endless filter belt comprises the floor of said spray coating cabin.

11. A system as set forth in claim 1, wherein:
the air pressure present within said spray defined between said spray coating cabin and said outer cabin has a value which is greater than the air pressure within said spray coating cabin, as well as being greater than the air pressure disposed externally of said outer cabin, so as to prevent the egress of the atmosphere, and said powder, out from said spray coating cabin, and the ingress of the atmosphere surrounding said outer cabin into said spaces defined between said spray coating cabin and said outer cabin.

12. A system as set forth in claim 1, wherein:
said powder comprises a coating material in powder form for applying a transparent cover coating to said articles which have been previously painted.

13. A system as set forth in claim 1, wherein:
said powder comprises a coating material in powder form for applying a primer coating to said articles which are to be subsequently painted.

14. A system as set forth in claim 1, wherein:
said longitudinal sides of said spray coating cabin are provided with vertically extending slits through which said spray coating means extend into said spray coating cabin so as to permit said spray coating means to be movably adjusted both vertically and laterally toward and away from said articles-to-be-spray-coated.

15. A system as set forth in claim 1, wherein:
said roof portion of said spray coating cabin is provided with longitudinally extending slits through which said spray coating means extend into said spray coating cabin so as to permit said spray coating means to be movably adjusted both vertically and longitudinally toward and away from said articles-to-be-spray-coated.

16. An electrostatic powder spray coating system for electrostatically spray coating articles, comprising:
a spray coating cabin;
means for transporting articles-to-be-spray-coated through said cabin in a longitudinal direction of said cabin;
an outer cabin spaced from said spray coating cabin along longitudinal sides of said spray coating cabin and along a roof portion of said spray coating cabin;
electrostatic powder spray coating means, disposed within spaces defined between said outer cabin and said spray coating cabin and extending through said longitudinal sides and said roof portion of said spray coating cabin, for electrostatically charging said powder to an electrical potential which is different from the electrical potential of said article-to-be-spray-coated and for electrostatically spray-coating said articles-to-be-spray-coated with said electrostatically charged powder;
a source of said powder fluidically connected to said electrostatic powder spray coating means for supplying said powder to said electrostatic powder spray coating means;
at least one endless filter belt, permeable to air but substantially impermeable to said powder, disposed within a bottom portion of said spray coating cabin for collecting excess powder disposed within said spray coating cabin; and
means operatively associated with said at least one endless filter belt for recovering said excess powder accumulated upon said at least one endless filter belt and for conveying said recovered excess powder to said source of said powder for reuse within said electrostatic powder spray coating means.

17. A system as set forth in claim 16, wherein:
said articles-to-be-spray-coated comprise car bodes.

18. A system as set forth in claim 16, wherein:
said at least one endless filter belt comprises a pair of endless filter belts disposed adjacent to each other but with said means for transporting said articles-to-be-spray-coated interposed between said pair of endless filter belts.

19. A system as set forth in claim 16, further comprising:
first vacuum means interposed between an upper run of said at least one endless filter belt and a lower run of said at least one endless filter belt whereby said first vacuum means causes aid excess powder to be attracted to and accumulate upon said upper run of said at least one endless filter belt; and
said means for recovering said excess powder comprises second vacuum means operatively associated with said upper run of said at least one endless filter belt for withdrawing said accumulated excess powder from said upper run of said at least one endless filter belt and conveying said recovered excess powder to said source of said powder.

20. A system as set forth in claim 16, wherein:
said longitudinal sides of said spray coating cabin are provided with vertically extending slits, and said roof portion of said spray coating cabin is provided with longitudinally extending slits, through which said spray coating means extend into said spray coating cabin so as to permit said spray coating means, respectively extending through said longitudinal sides and said roof portion of said spray coating cabin, to be movably adjusted both vertically and laterally, and vertically and longitudinally, respectively, toward and away from said articles-to-be-spray-coated.

* * * * *